0
United States Patent Office 3,065,253
Patented Nov. 20, 1962

3,065,253
PROCESS FOR THE ALKYLATION OF
HALOGENOSILANES
Will D. Merritt, Jr., Schenectady, N.Y., assignor to General Electric Company, a corporation of New York
No Drawing. Filed Dec. 27, 1960, Ser. No. 78,332
4 Claims. (Cl. 260—448.2)

The present invention relates to a process for alkylating halogenosilanes. More particularly, the present invention relates to the employment of certain substituted silicon hydrides as promoters for the alkylation of halogenosilanes with organoaluminum compounds.

Various methods are known to the art for "upgrading" halogenosilanes such as methyltrichlorosilane to produce more commercially desirable products such as dimethyldichlorosilane. For example, in Sauer Patent 2,647,136 there are disclosed redistribution reactions between different chlorosilanes in which one chlorosilane has a different number of alkyl radicals and chlorine atoms attached to its silicon atom than are attached to the silicon atom of the other co-reacting chlorosilane. The redistribution reaction has been achieved by various methods and one of the most attractive methods is to conduct the redistribution reaction at high pressure and at elevated temperatures in the presence of a Friedel-Crafts catalyst, such as a complex salt of an aluminum halide. Although the redistribution reaction is quite effective in upgrading the less economically desirable more highly halogenated silane reaction products that are produced commercially, such as methyltrichlorosilane, the redistribution reaction must resort to the employment of more highly alkylated and often less readily accessible silanes such as trimethylchlorosilane.

Another method that can be employed to upgrade halogenated silanes is the alkylation of halogenated silanes with an organoaluminum compound. The advantages of the alkylation method over the redistribution method are obvious since organoaluminum compounds are easily derived from readily available materials such as methylchloride and aluminum. The alkylation of halogenosilanes with an organoaluminum compound has not been economically attractive, however, since long reaction periods such as ten hours or more, and high temperatures exceeding 250° C. are often required to achieve desirable results.

The present invention is based on the discovery that if a silane containing a Si-H linkage is present in minor amounts in an alkylation mixture comprising an organoaluminum compound and a halogenosilane, the alkylation of the halogenosilane proceeds much faster and at a lower temperature.

In accordance with the present invention there is provided a process for the alkylation of the halogenosilane having the formula:

(1) 

comprising (1) forming a mixture of said halogenosilane an organoaluminum compound, and from 0.5% to 10%, and preferably from 1.0 to 5%, based on the weight of said halogenosilane of a silicon hydride having the formula:

(2) 

and heating said mixture at a temperature in the range of about 60° C. to 350° C., and (2) recovering the resulting alkylated halogenosilane reaction product, where $b$ is an integer equal to from 1 to 4, inclusive, $a$, $c$ and $d$ are whole numbers equal to from 0 to 3, inclusive, and the sum of $c$ and $d$ is equal to from 0 to 3, inclusive, while the sum of $b$, $c$ and $d$ is equal to 4, X is a halogen radical and R is a monovalent hydrocarbon radical.

Included within the radicals represented by R of Formulae 1 and 2 are aryl radicals, such as phenyl, xylyl, tolyl, etc. radicals; alkaryl radicals such as phenylethyl, benzyl, etc. radicals; aliphatic and cycloaliphatic radicals, including alkyl, alkenyl, cycloalkyl, such as methyl, ethyl, propyl, butyl, cyclohexyl, etc. radicals. R is preferably a lower alkyl radical such as methyl, X of Formulae 1 and and 2 includes chloro, bromo, fluoro, etc. and is preferably chloro.

The aluminum compounds that are included within the scope of the present invention have the formula:

(3) 

where $e$ is an integer equal to from 1 to 3, inclusive, R' is a lower alkyl radical, including methyl, ethyl, propyl, butyl, amyl, etc. and X is as defined above. Specific examples of organoaluminum compounds that can be employed in the process of the present invention include, ethyl aluminum dichloride, trimethyl aluminum, methyl aluminum dichloride, diethyl aluminum chloride, dimethyl aluminum chloride, tripropyl aluminum, tributyl aluminum, etc. and mixtures thereof.

Included within the halogenosilanes of Formula 1 are methyltrichlorosilane, tetrachlorosilane, dimethyldichlorosilane, trimethylchlorosilane, phenyltrichlorosilane, methylphenyldichlorosilane, etc. Silicon hydrides within the scope of Formula 2 are methyldichlorosilane, methylchlorosilane, trimethylsilane, trichlorosilane, dimethylchlorosilane, phenyldichlorosilane, etc.

In the practice of the invention, a mixture of the halogenosilane, the organoaluminum compound, and the silicon hydride is formed, and the temperature of the resulting mixture is elevated to initiate reaction. The alkylated reaction products are then separated at the termination of the reaction from the resulting mixture.

The order of addition of the reactants that are employed to form the mixture is not critical. It has been found desirable however, to avoid unduly exposing the organoaluminum compound to air or oxygen due to its spontaneously flammable nature. In forming the mixture therefore, it is necessary to employ either an inert gas purge, or the organoaluminum compound can be added to a mixture of the halogenosilane and silicon hydride.

Although the ratio of organoaluminum compound to halogenosilane that is employed to form the mixture is not critical, in view of economic considerations, experience has shown that the organoaluminum compound should be utilized in amounts no greater than that sufficient to provide at least one organo radical of the organoaluminum compound per halogen radical of the halogenosilane. For example, in a mixture containing an organotrihalogenosilane, no more than a equimolar amount of a triorganoaluminum compound should be employed for efficient results. In the production of a diorganodihalogenosilane, however, from an organotrihalogenosilane, if the organoaluminum compound is employed in the form of a sesquichloride, it is preferred to employ at least one mol of the organoaluminum compound, for about every three moles of the organotrihalogenosilane.

Temperatures in the range of 60° C. to 350° C. can be employed while a preferred range is 100° C. to 200° C. The reaction can be conducted under autogenous pressure to achieve desirable results. Reaction times can vary in the range of ½ to 10 hours, and will be influenced by such factors as the amount of the silicon hydride promoter utilized, the temperature employed, reactant ratios, etc.

In recovering the final reaction product, well known physical methods, such as decantation, distillation, filtration, etc. can be employed in accordance with procedures known to the art.

In order that those skilled in the art can be better able to practice the invention, the following examples are given by way of illustration and not by way of limitation.

Methyl aluminum sesquichloride as used in the examples below was prepared in accordance with the following procedure.

Aluminum turnings in the form of an aluminum alloy containing about 5% by weight of copper, were placed in a closed vessel and heated to about 130° C. to eliminate any traces of water. Anhydrous hydrogen chloride was then passed into the system to activate the aluminum. The hydrogen chloride flow was continued until the temperature of the system rose to about 160° C., causing traces of aluminum chloride to appear on the walls of the vessel, and on the aluminum surface. The flow of hydrogen chloride was then stopped and methyl chloride was introduced into the vessel to initiate the reaction and continued thereafter at a rate sufficient to maintain the reaction temperature between about 70° to 80° C. The reaction was continued until the aluminum turnings were completely converted to methyl aluminum sesquichloride, a straw-colored liquid.

EXAMPLE 1

Methyl aluminum sesquichloride, prepared above, was introduced into a closed vessel that had been flushed with nitrogen. A charge of methyltrichlorosilane and methyldichlorosilane was then introduced into the vessel at a temperature of about 25° C. The resulting mixture contained a 20 to 1 mole ratio of methyltrichlorosilane to methyldichlorosilane and a 3 to 1 mole ratio of methyltrichlorosilane to methyl aluminum sesquichloride. The temperature of the mixture was then gradually raised to about 125° C. to initiate the reaction which was completed in about 2 hours at a temperature of 200° C. The reaction product consisted of about 50 mole percent of dimethyldichlorosilane and 50 mole percent of other silanes, including tetramethylsilane, dimethylchlorosilane, methyltrichlorosilane, etc. When the above procedure was repeated with a reaction mixture that was free of methyldichlorosilane, it was found that after the reaction had run for about 20 hours at 200° C., the reaction product contained only about 14 mole percent dimethyldichlorosilane.

EXAMPLE 2

Equimolar mixtures of methyltrichlorosilane and methyl aluminum sesquichloride containing 0.22%, 1.7% and 4.15% respectively of methyldichlorosilane, based on the weight of methyltrichlorosilane, were placed in a series of cylinders that had been purged of air. After they were sealed, the cylinders were immersed in a bath at 101° C. for 1½ hours. The mixtures were then analyzed by means of a mass spectograph to determine the degree of alkylation that had taken place in the mixtures in terms of the mole ratio of tetramethylsilane to methyltrichlorosilane that was present, and the effect of varying the concentration of the methyldichlorosilane promoter.

The table below lists the weight percent methyldichlorosilane in each reaction mixture and mole ratio of tetramethylsilane to methyltrichlorosilane at the end of the reaction.

Table I

| Percent $CH_3SiHCl_2$ | $(CH_3)_4Si/CH_3SiCl_3$ |
|---|---|
| 0.22 | .032 |
| 1.7 | 100 |
| 4.15 | ∞ |

The above results clearly establish the advantages realized by the practice of the present invention in terms of reducing the time required to alkylate methyltrichlorosilane with methyl aluminum sesquich'oride. The latter alkylating material can be produced from readily accessible aluminum metal and methyl chloride as shown previously.

While the foregoing examples have of necessity been limited to only a few of the very many variables within the scope of the present invention, it should be understood that the present invention covers a much broader class of organoaluminum compounds and silicon hydrides as illustrated by Formulae 3 and 2 respectively, which can be employed to alkylate chlorosilanes illustrated by Formula 1.

What I claim as new and desire to secure by Letters Patent of the United States is:

1. A process for alkylating a halogenosilane having the formula:

$$(R)_aSi(X)_{4-a}$$

comprising (1) forming a mixture of said halogenosilane, an organoaluminum compound, having the formula $R'_eAl(X)_{3-e}$ and from 0.5% to 10% based on the weight of said halogenosilane of a silicon hydride having the formula:

$$(H)_bSi(R)_c(X)_d$$

and heating said mixture at a temperature in the range of about 60° C. to 350° C. and (2) recovering the resulting alkylated halogenosilane reaction product, where $b$ is an integer equal to from 1 to 4, inclusive, $a$, $c$ and $d$ are whole numbers equal to from 0 to 3, inclusive, and the sum of $c$ and $d$ is equal to from 0 to 3, inclusive, while the sum of $b$, $c$ and $d$ is equal to 4, $e$ is an integer equal to from 1 to 3, X is a halogen radical, R is a monovalent hydrocarbon radical, and R' is a lower alkyl radical.

2. A process in accordance with claim 1, where said organoaluminum compound is methyl aluminum sesquichloride.

3. A process in accordance with claim 2, where there is utilized three moles of said halogenosilane per mole of said organoaluminum compound.

4. A process in accordance with claim 1, where said silicon hydride is methyldichlorosilane.

References Cited in the file of this patent

UNITED STATES PATENTS

| 2,762,824 | Brown | Sept. 11, 1956 |
| 2,786,861 | McEntee | Mar. 26, 1957 |
| 2,857,414 | Schmidt et al. | Oct. 21, 1958 |
| 2,914,549 | Anderson | Nov. 24, 1959 |
| 2,945,874 | Jenkner | July 19, 1960 |
| 2,949,481 | Anderson et al. | Aug. 16, 1960 |

FOREIGN PATENTS

| 1,038,184 | France | May 6, 1953 |
| 1,204,830 | France | Aug. 10, 1959 |

OTHER REFERENCES

Lengyel et al.: "Zeitschrift fur Anorg. und Allgemeine Chemie," vol. 287 (1956), pp. 273–81.